United States Patent [19]

Pirez et al.

[11] Patent Number: 5,572,548
[45] Date of Patent: Nov. 5, 1996

[54] METHOD OF COHERENT MODULATION AND DEMODULATION FOR HIGH FREQUENCY DATA TRANSMISSION AT HIGH BIT RATE

[75] Inventors: Didier Pirez, Sannois; Denis Gombault, Courbevoie, both of France

[73] Assignee: THOMSON-CSF, Puteaux, France

[21] Appl. No.: 994,912

[22] Filed: Dec. 22, 1992

[30] Foreign Application Priority Data

Dec. 26, 1991 [FR] France ................................ 91 16165

[51] Int. Cl.$^6$ .............................. H04L 27/18; H04L 27/26
[52] U.S. Cl. ......................... 375/260; 375/283; 375/284; 375/350; 370/23
[58] Field of Search ..................... 375/222, 260, 375/279, 283–285, 350, 368; 370/19–20, 23, 69.1, 70, 123; 371/43; 329/304; 332/103

[56] References Cited

U.S. PATENT DOCUMENTS

| | | | |
|---|---|---|---|
| 4,383,316 | 5/1983 | Seidel | 375/260 X |
| 4,881,241 | 11/1989 | Pommier et al. | 375/260 |
| 4,881,245 | 11/1989 | Walker et al. | 375/260 |
| 5,170,413 | 12/1992 | Hess et al. | 375/260 |
| 5,191,576 | 3/1993 | Pommier et al. | 370/69.1 X |
| 5,228,025 | 7/1993 | Le Floch et al. | 370/20 |
| 5,243,629 | 9/1993 | Wei | 375/299 |
| 5,274,629 | 12/1993 | Helard et al. | 375/260 X |
| 5,357,502 | 10/1994 | Castelain et al. | 370/19 |

FOREIGN PATENT DOCUMENTS 0441731  8/1991  European Pat. Off. .
WO 91/20140  12/1991  WIPO .

OTHER PUBLICATIONS

Schueli, Philips Research Reports Supplements, 1973, pp. 91–98.
Pennington, IEEE Proceedings, 1989, pp. 11–19. "Techniques for medium-speed data transmission over HF channels".

Primary Examiner—Young T. Tse
Attorney, Agent, or Firm—Oblon, Spivak, McClelland, Maier & Neustadt, P.C.

[57] ABSTRACT

The method is of the type featuring a parallel transmission, over a predetermined number of transmission frequencies at a low bit rate, of useful information signals modulated at a predetermined phase shift keying. A parallel transmission on all the frequencies of the frames of useful signals and of frames of reference signals is performed, a frame of reference signals being inserted between two neighboring useful frames, and each reference signals being alternated with a useful signal in each frame of the reference signals. Such a method finds particular application to the digital transmission of speech.

2 Claims, 4 Drawing Sheets

METHOD OF COHERENT MODULATION AND DEMODULATION FOR HIGH FREQUENCY DATA TRANSMISSION AT HIGH BIT RATE

BACKGROUND OF THE INVENTION

1. Field of the Invention

The present invention relates to a method of coherent modulation and demodulation for HF (high frequency) data transmission at a high bit rate.

It can be applied notably to the digital tranmission of speech by radio.

2. Description of the Prior Art

It is known that, in ionospheric HF links, data is propagated by reflections on the layers of the ionosphere along multiple propagation paths. Owing to the turbulence of the ionospheric environment, the signal received for each of the paths varies randomly in amplitude and in phase. This prompts a phenomenon of fading of the composite signal received. Since the propagation times on each of the paths are dissimilar, the received signal is formed by several components spread out in time over an interval that may reach several milliseconds. Furthermore, the temporal variations of the heights of the ionospheric layers prompt frequency deviations that are characterized by Doppler shifts on each of the components of the multiple path.

All these effects are combined to produce a distortion of the signal and lower the quality of the link. The result of this is that transmissions of data at a high bit rate in the HF range are made particularly difficult. This is the reason for the introduction, historically, of parallel modulators-demodulators, also known as parallel modems, transmitting a large number of carriers in parallel, at low modulation speed. The most common type of modulation used is that of the M-ary differential phase-shift keying, which can be used to transmit several bits per symbol on each sub-carrier, in using a smaller bandwidth.

The signal emitted is then formed by a sequence of frames with a duration T equal to about 20 milliseconds, each frame being constituted by a sum of N sinusoidal waveforms at multiple frequencies of a quantity $D_f$ computed so as ensure the orthogonal quality of the sub-carriers for a duration of time $T_u$ smaller than the duration of the frame T.

The difference $T_g = T - T_u$ defines a safety interval that makes it possible to prevent inter-symbol interference in the period of analysis $T_u$. This makes it possible, in each frame, to separate different sub-carriers by a Fourier Transform and to demodulate them one by one. The modulation used on each sub-carrier is generally a binary or 4-ary differential phase shift keying.

One of the first HF transmission systems based on a parallel waveform modem is known from the article by R. R. Mosier and R. G. Clabaugh, "Kineplex, A Bandwidth Efficient Binary Transmission System" in the journal *AIEE Trans*, Part I, Communications and Electronics, 1958, 76, pp. 723–728. This modem, used for the point-to-point transmission of data, used 16 sub-channels at a bit rate of 75 bauds, with a 4-ary differential phase shift keying. The total bit rate achieved was 1400 bits per second. Another system known as "KATHRYN" has been developed by General Atronix in 1961 and is described in the article by P. R. Kirshal Gray and D. W. Hanna JR, "Field Test Result of the AN/GSC-10 Digital Data Terminal" in the journal *IEEE Trans.*, 1968, COM-17, pp 118–128. This system enabled a modulation of 34 sub-carriers at 75 bauds. The modulation performed on each sub-carrier made it possible to measure the characteristic of the transmission channel for each of them and to correct the phase of each useful data element. The high performance characteristics of this method are however limited to slow fading and to a spread of the multiple paths that does not exceed one millisecond.

A new multitone method, known as codem, was subsequently developed in 1971 by General Atronix. This method, described in an article by D. Chase, "A Combinated Coding and Modulation Approach for Communications over Dispersive Channels" in the journal *IEEE Transactions*, 1973 COM-21, pp. 159–174, performed an M-ary differential phase-shift keying on a waveform formed by 25 orthogonal carriers using a weighted-decision error-correction code (25, 16) based on the amplitudes of the real and imaginary parts of the symbol, making it possible to reduce the effects of the selective "fading". Measurements made on this method have shown a gain in performance equal to about twice that of a 16-tone modem. The techniques used by the "codem" method were developed later in the context of the ANDVT (advanced neuroband digital voice terminal) standard, described in the article by W. M. Jewet and R. Cole JR. in *NRL Memorandum Report* 3811. They are applied in a modulator-demodulator optimized for digital phonic transmission with 39 tones spaced out at 56.25 Hz, with a useful frame duration equal to 17.8 ms; in 4-ary differential phase-shift keying (4-DPSK). In this modem, each frame formed by 39 symbols is transmitted at the bit rate of 44.44 Hz which corresponds to a duration of 22.5 ms divided into 17.8 ms of useful frame and 4.7 ms of safety interval. The total bit rate is about 1733.3 bauds and 3466.6 bits per second. At 2400 bits per second, the additional bit is used for protection with a redundancy of 2 of the 24 most significant bits of the phonic frame formed by 54 bits. In this coding, the safety interval of 4.7 ms and a sequential interleaving on the 34 tones made it possible to overcome the effects of ionospheric propagation.

Finally, in 1988, the Harris RF Communication group devised and perfected a multitone modem that had been already described by G. J. Luhowy and F. A. Perkins in "Advances in HF Technology", *Harris Communication*, 29 Sep. 1983. This modem is based on a 39-carrier parallel waveform. At 2400 bits per second, a Reed-Solomon code (14, 10, 2) and a temporal interleaving operation make it possible to minimize the influence of the multiple paths. For lower bit rates, stronger codes are used. In order to improve the precision of the phase reference for the phase demodulation, the HARRIS group has also developed a technique known as IPSK (Interpolated PSK) which can be used to obtain improvements as compared with the performance characteristics of a standard differential demodulation operation. In this method, the tones are alternately modulated with useful data and reference phases. In reception, the information on the phase reference is extracted from the reference tones, and an interpolation algorithm is used to obtain the values between these tones. The useful phases are determined by the difference between the interpolated reference phases and the values of the received phases.

While the advantage of the above-mentioned types of processing is that they can be implemented in a relatively simple way, they are nevertheless limited by a certain number of factors. First of all, the amplitude of the waveform emitted is not constant, and there is a ratio of about 10, in terms of decibels, between the peak power emitted and the mean power, although this result might have to be revised somewhat inasmuch as the modem generally undergoes a certain degree of clipping at emission. It also turns out to be the case that the modem is always highly sensitive to the selective fading in frequency produced by the multiple paths for the transfer function of the channel can always show deep fading at certain frequencies which lead to very high errors rates on the corresponding sub-carriers, although an error-correction coding and a frequency interleaving can be used to combat this phenomenon. Furthermore, differential demodulation always entails a loss of some decibels in comparison to coherent demodulation, this loss being about 2 decibels in non-coded QPSK on a white noise channel for example, although interpolation in the HARRIS modem makes it possible to reduce this loss. Finally, the lack of reliable information at the level of the demodulation prevents a weighted decoding of convolutional or other codes.

SUMMARY OF INVENTION

The aim of the invention is to overcome the above-mentioned drawbacks.

To this end, an object of the invention is a method of coherent modulation and demodulation for HF data transmission at a high bit rate, of the type consisting of the parallel transmission, on a determined number of channels at low bit rates, of the useful information symbols, the signals representing these symbols being modulated according to a modulation comprising a determined number of phase states, wherein a parallel transmission is made, on all the channels, of the frames of useful signals and of the frames of reference symbols, a frame of reference symbols being inserted between two neighboring useful frames, and each reference symbol being alternated with a useful symbol in each frame of reference symbols.

BRIEF DESCRIPTION OF THE DRAWINGS

Other features and advantages of the invention will appear here below from the following description, made with reference to the appended drawings, of which.

DETAILED DESCRIPTION OF THE INVENTION

Unlike in the case of the conditions prescribed by the ANDVT standard referred to here above, the modulation method according to the invention implements a coherent demodulation by means of a transmission of reference sub-carriers known to the receiver. This arrangement makes it possible, for each sub-carrier conveying a useful information, firstly to estimate a phase and amplitude reference as well as a noise level and, secondly, to carry out a weighted coherent decoding of the standard convolutional codes or coded modulations. In the exemplary embodiment described hereinafter, the protection against fading and the multiple paths is achieved by a variable length temporal interleaving and by an 8-ary phase-shift keying (8 PSK) with redundancy of 4/3 which, as in the case of the ANTDV standard, protects the significant bits of digital frames transmitted by vocoders. Thus, for example, in the case of vocoders encoded according to the NATO standard LPC10 (2400 bits/s) where each frame has 54 bits, 41 bits being assigned for the coding of the 10 coefficients of the synthesis filter, 5 bits being used for the coding of the energy on 32 values, 7 bits transmitting the voicing or the pitch, and 1 bit being used for the synchronization, the significant bits to be protected are then 6 significant bits for the pitch, 3 or 4 significant bits for the energy, 2 to 4 significant bits for the first four coefficients of the synthesis filter as well as the synchronization bit, which leads to the protecting of about 21 bits.

The transmission at a high bit rate is achieved by the parallel connection of a sufficient number of low bit rate channels on adjacent frequencies, the frequency interval between each channel being chosen so as to ensure the orthogonal character of the symbols.

Figure 1:
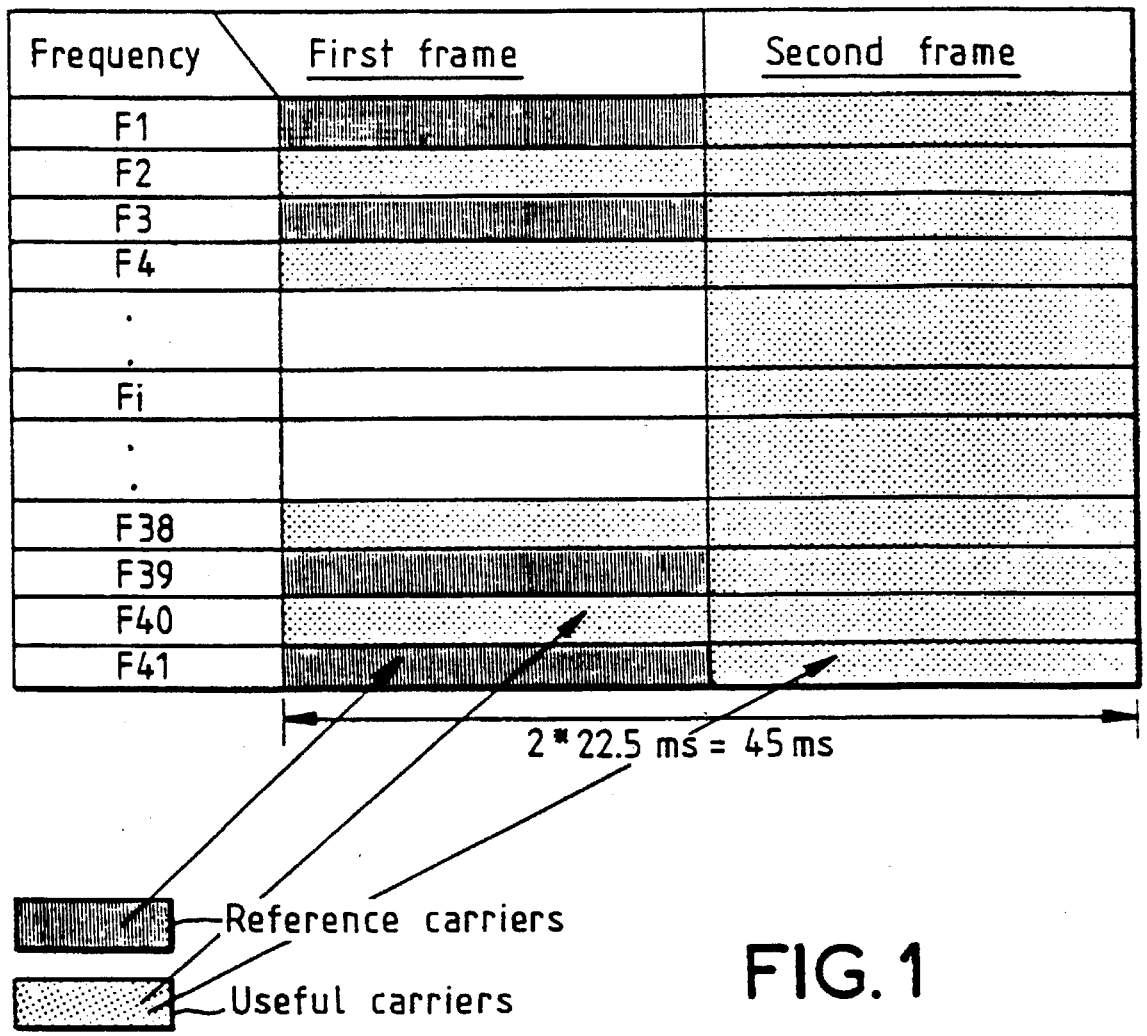
FIG. 1 is a table of distribution of the reference symbols in one out of two frames in relation to the carrier frequencies of each of the frames.
Figure 2:
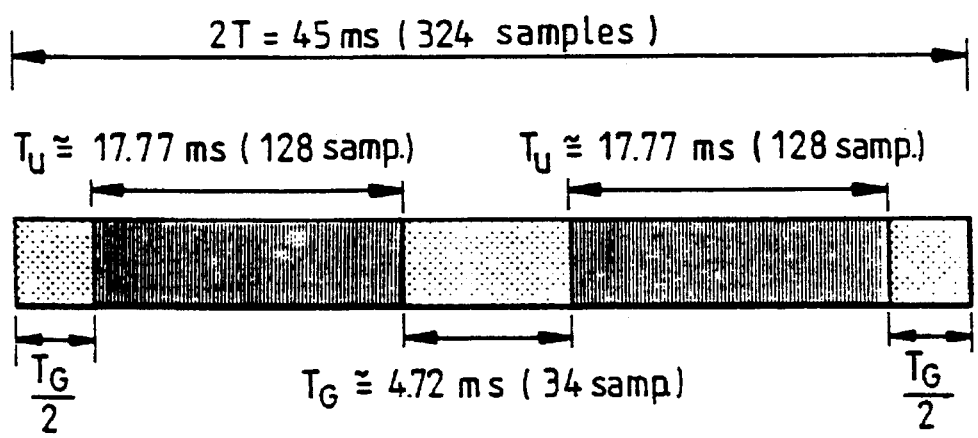
FIG. 2 shows a temporal dimensioning of the frames.

In the case of the standard LPC10, this leads to the use of 41 carriers, of which 21, for example the odd-numbered carriers $(1, 3, \ldots, 41)$ convey reference symbols in one out of two frames in the manner represented by the table of the frequencies of FIG. 1 and by the temporal distribution of these frequencies of FIG. 2, both shown in two successive frames. Since, in this case, the duration of a frame is 22.5 ms, the transmission bit rate obtained is 44.44 frames/second. The corresponding temporal signal is obtained by a reverse Fourier transform of these frequencies on 128 points. With, for example, a sampling frequency of 7200 Hz, the frequency interval between each carrier is, under these conditions, equal to 56.25 Hz, leading in the manner shown in FIG. 2 to a useful frame duration $T_u=17.77$ ms and to a safety interval $T_G=4.72$ ms.

The signal sent out during the safety interval is obtained by making the useful zone periodic in order to prevent the phase discontinuities at the limits of this zone.

Figure 3:
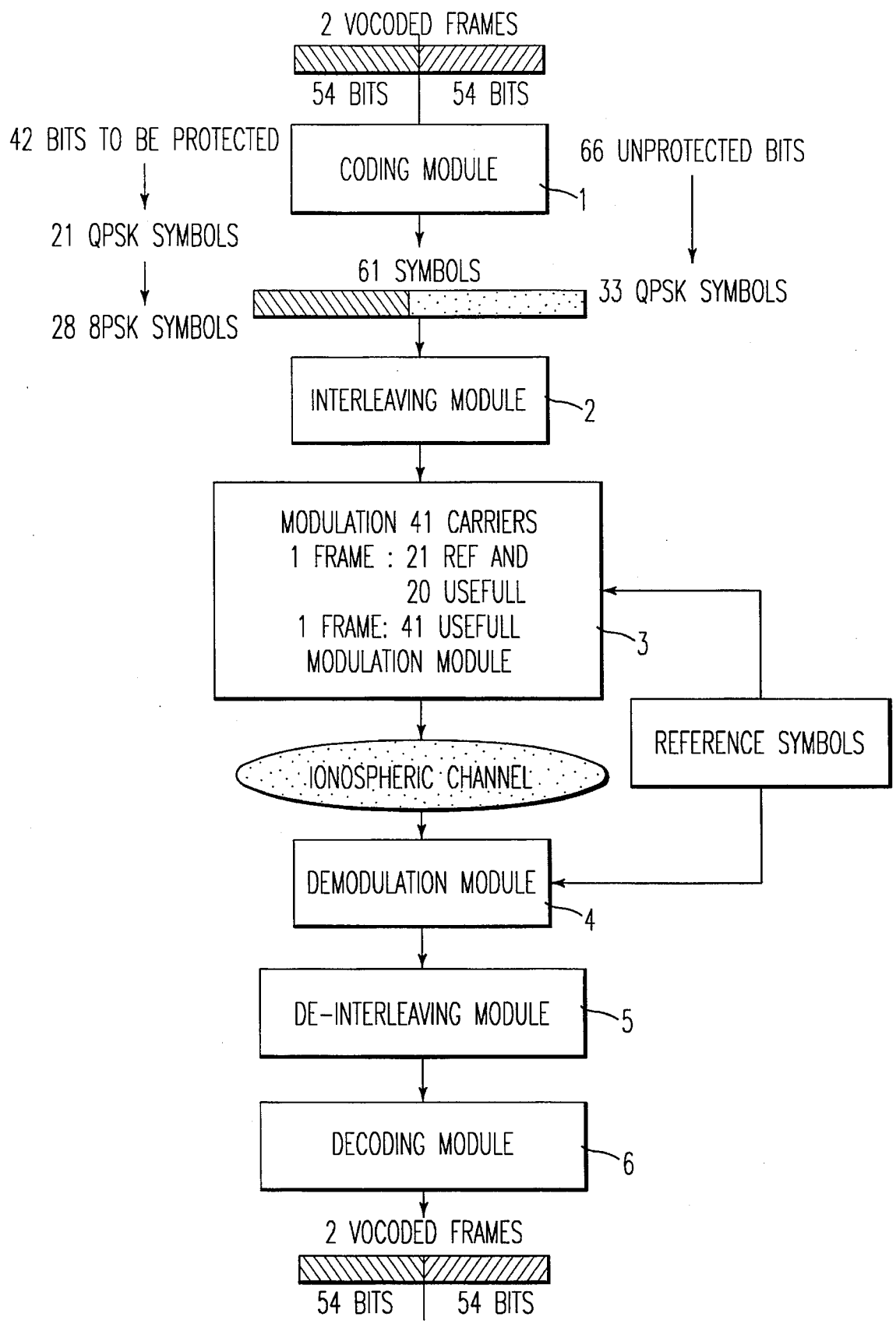
FIG. 3 shows an embodiment of a modem according to the invention.

A corresponding modem operation structure working according to this principle is shown in FIG. 3. In the emission part, the modem has a coding module 1, an interleaving module 2 and a modulation module 3. The reception part has a demodulation module 4, a de-interleaving module 5 and a decoding module 6. The coding module 1 and decoding module 6 carry out a 8-ary phase-shift keying with redundancy 4/3 for the protection, as in the case of the ANDVT standard, of the significant bits of each transmitted vocoded frame. Thus if, as in the case of the LCP10 standard, 21 bits have to be protected in each frame, these bits give rise to 21/2 QPSK symbols and to 14 symbols with 8 PSK coding. By thereafter taking two vocoded frames of 108 bits, it becomes possible to protect the 42 most significant bits on the two frames. The output of the coder i gives, under these conditions:

$$\frac{42}{2} \cdot \frac{4}{3} = 28 \text{ protected 8PSK symbols and } \frac{108-42}{2} = 33$$

unprotected QPSK symbols.

Figure 4A:
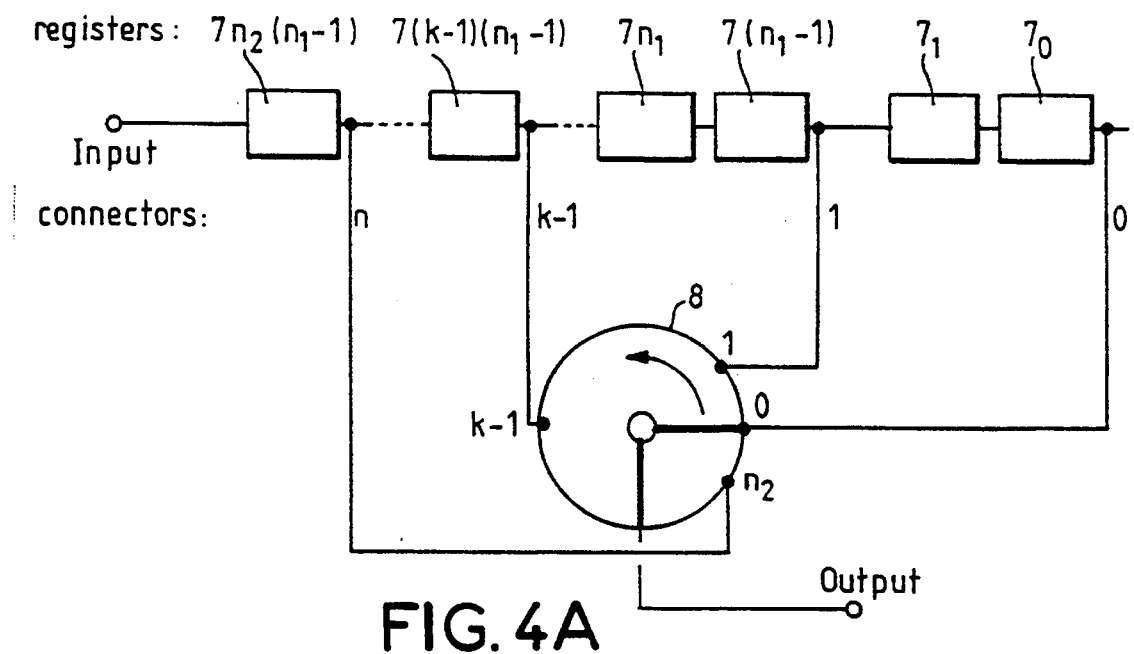
FIGS. 4A and 4B show embodiments of the interleaving and de-interleaving modules of FIG. 3.

In all, the coder 1 gives 61 symbols distributed over 2 frames, 20 on the first frame (on the even-numbered carriers for example) and 41 on the second frame as is shown by the table of FIG. 1. The interleaving that follows is implemented by the interleaving module 2 formed, in the manner shown in FIG. 4A, by $n_2(n_1-1)$ shift registers referenced $7_0$ to $7n_2(n_1-1)$, the connectors of which are located at multiples of $(n_1-1)$.

Figure 4B:
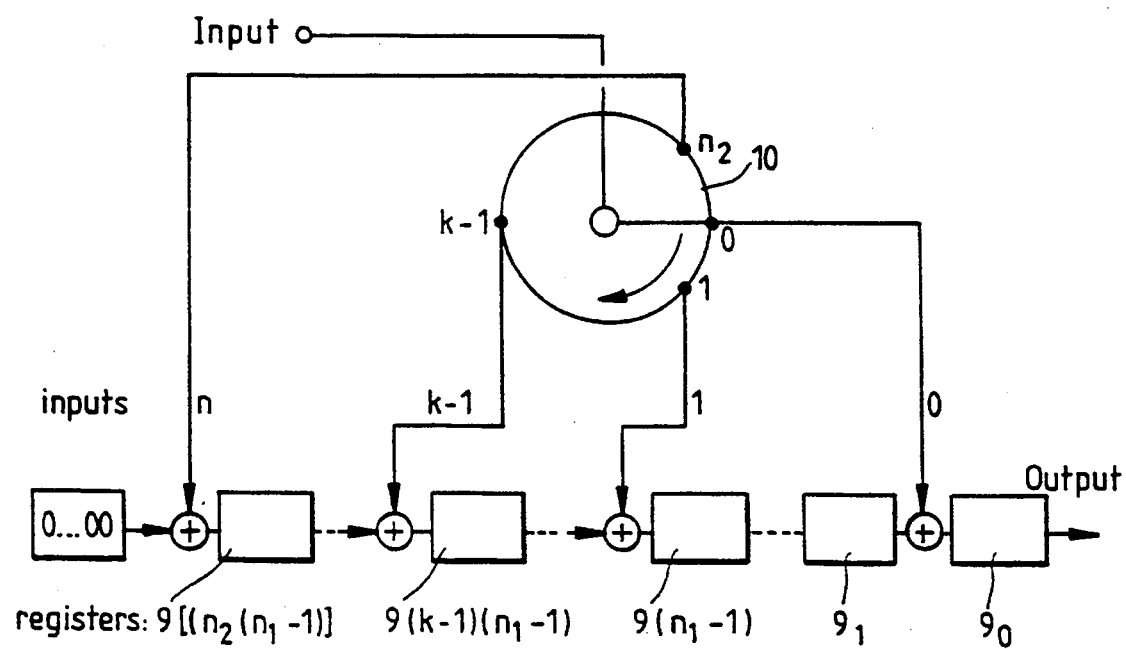

The de-interleaving is done by the module 5 also formed in the manner shown in FIG. 4B by a set of $n_2(n_1-1)+1$ series-connected shift registers, referenced $9_0$ to $9n_2(n_1-1)$ and a change-over switch 10 that cyclically connects the input of the interleaving module to the different outputs of the registers.

To carry out the estimation of the channel starting from the first reference frame transmitted up to the last useful frame, the set of information elements sent is preceded and followed by 16 additional frames. These frames, structured like the above-mentioned ones, contain reference symbols, once in very two instances, to estimate the channel upline and downline of each frame to be demodulated. The reference symbols are, for example, produced randomly every two frames and stored thereafter in a file that is read during the demodulation.

The recovery of the signals on each of the carriers of the transmission band is done by the demodulation module 4 by an inverse Fourier transform on the 128 samples of the useful temporal frame. This makes it possible to have available, in one out of every two frames, information concerning the channel in the 21 odd-numbered reference carriers. After estimation of the channel and of the noise at the demodulation module 4, the decoding done in the decoding module 6 consists in making a search, for each symbol received, of the code that minimizes the following relationship:

$$\sum_i \text{Real} \left\{ \frac{a_i^* \cdot \alpha_i^* \cdot Z_i}{\sigma_i^2} \right\}$$

where $\alpha_i^*$ is the conjugate value of the estimated channel
$Z_i$ is the symbol received
$\sigma_i^2$ is the variance of the noise and
$\alpha_i$ is the reference symbol on a given path.

Figure 5:
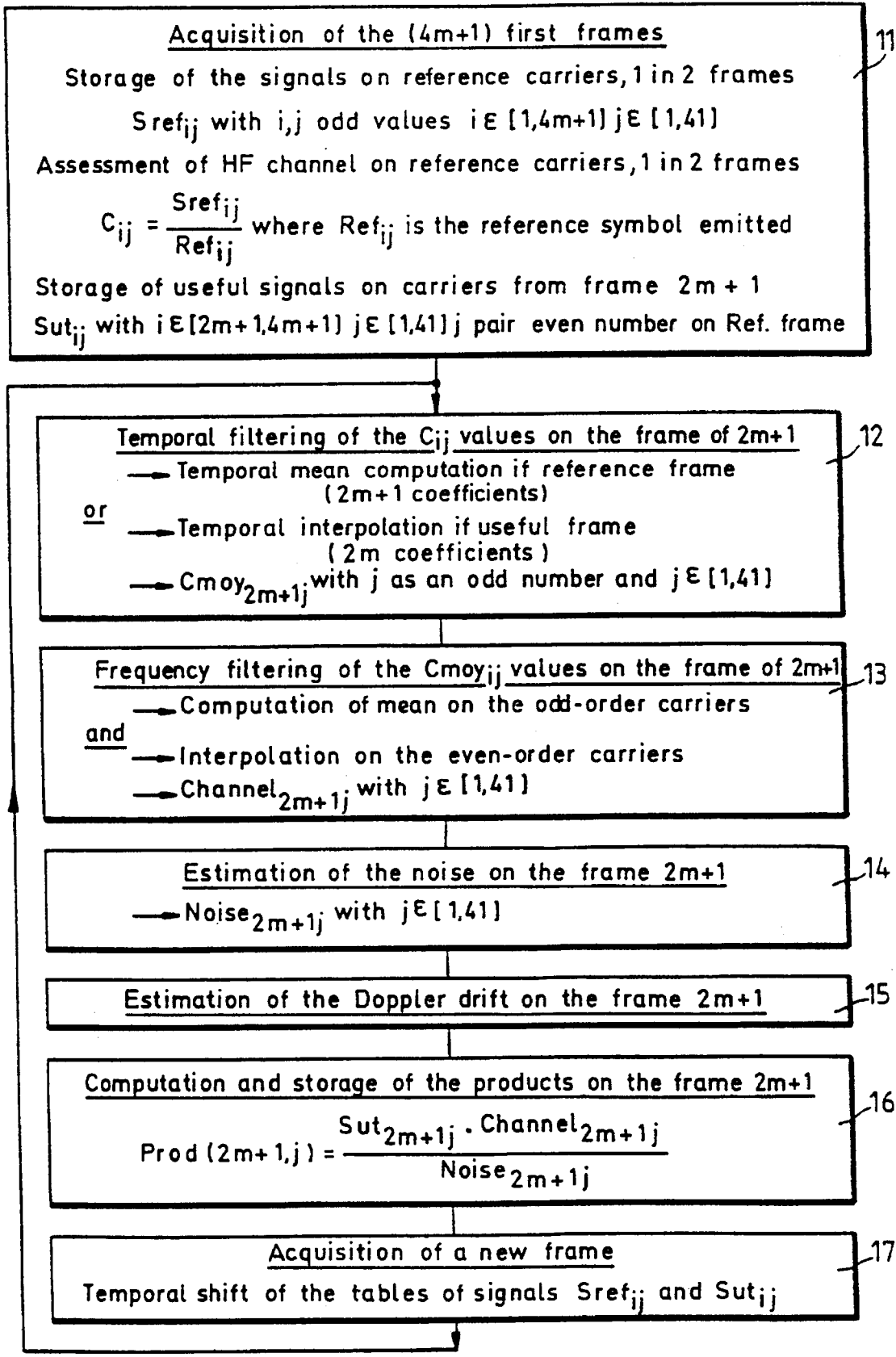
FIG. 5 is a flow chart to illustrate the working of a demodulator shown in the block diagram of FIG. 3.

The block diagram shown in FIG. 5 shows the different steps referenced 11 to 17 of the algorithm used. In this diagram, $2m$ represents the number of frames added at the start and at the end of transmission to estimate the channel. The acquisition of the $4m+1$ first frames takes place at the step 11 to carry out a first assesment $C_{ij}$ of the HF channel on the reference carriers one out of two frames, each value $C_{ij}$ being obtained by the quotient of the signal $Sref_{ij}$ on the reference carrier (for j odd number and j∈1.41) with a reference value $Ref_{ij}$ known to the demodulator. In this step, the useful signals $Sut_{ij}$ are stored starting from the frame $2m+1$.

The estimation of the channel that takes place at the step 12 consists in making a temporal filtering of the values $C_{ij}$. This filtering consists in making a search for the coefficients of the filter and the number of coefficients among them reducing the mean error of estimation to the minimum. To filter the first value of the channel on the first reference frame transmitted, it is necessary to have available the $2m$ additional frames that precede this first reference frame transmitted. One out of two of these frames convey reference symbols on the 21 odd-numbered carriers.

If h(i) designates the coefficients of the filter, the mean value $C_{moy2m+1,j}$ obtained at the output of the filter is defined by the relationship:

$$C_{moy2m+1,j} = \sum_{i=-m}^{m} h(i) \cdot C_2(i + |m| + 1, j)$$

for j odd number ranging from 1 to 41.

Since a useful frame contains no carrier conveying reference symbols, a temporal interpolation on the 21 odd-order carriers of this frame is done with a number of coefficients of the mean computation filter that is fixed at $2m$.

For the same reasons as above, the last useful frame transmitted is followed by $2m$ additional frames to carry out the estimation of the channel.

The frequency filtering that is done at the step 13 consists in the performance, on each frame, of a frequency filtering on each of the carriers. This is obtained by a set of filters with a number of coefficients that is variable as a function of the position of each carrier considered in the frame. On the odd-order carriers which give information elements on the frame, the filters implemented are odd-order filters. For the other cases, a frequency interpolation is performed. These filters are of a low-pass type. Since the maximum time limit of the multiple paths is generally of the order of ±2 ms, only that part of the signal included between these two values is chosen. This makes it possible, for any $2m+1$ ranking frame, to obtain an estimation of the channel on each of the 41 carriers.

The estimation of the noise takes place at the step 14.

The instantaneous noise values on the odd-order carriers of a reference frame are determined by a relationship having the form:

$$b_{inst}(j) = |C_j - \text{Channel}_j|^2 \text{ with}$$

$C_j$=noise-affected value of the channel on the carrier j and $\text{Channel}_j$=estimated value of the channel after filtering on the carrier j, for j as an odd number ranging from 1 to 41.

These instantaneous noise values are then filtered by a low frequency Butterworth filter with a third-order narrow band.

For a useful frame where there are no reference signals making it possible to determine the $C_j$ values, the values of the noise are estimated on the two reference frames on either side of the frame considered. A mean of the two estimations makes it possible to obtain the value of the noise on the odd-order carriers of the useful frame.

The values on the even-order carriers of the frame are also obtained by the same type of interpolation.

Thus, on all the carriers of a $2m+1$ ranking frame, there are Noise(j) values available for the estimation of the noise j ranging from 1 to 41.

The estimation of the Doppler drift done at the step 15 takes place according to a principle resembling that of the ANDVT standard. This is obtained by taking a mean value, on all the carriers, of the differences in phase found between two successive frames on the estimation of the channel. It is assumed, in this case, that the variations in phase due to the fading are small.

The noise-affected phase signal on the frame i is then:

$$\text{Phase signal } (i) = \sum_{j=1}^{N\text{carriers}} \frac{\text{Channel}_{(i-1)j} \cdot \text{Channel}_{ij}}{\text{Noise}_{ij}} *$$

It being assumed that the noise is constant between two successive frames.

This signal is then filtered by a third-order complex Butterworth filter, for which the product FcTe (cut-off frequency × sampling period) is very low.

The estimation of the frame-by-frame drift that is thus obtained remains relatively smooth and is expressed by the relationship:

$$\text{Drift } (i) = \frac{\theta_i}{2\pi T}$$

wherein $\theta$ is the phase of the phase signal filtered on the frame i and T is the frame period (T=22.5 ms).

The computation and storage of the products on the $2m+1$ ranking frame performed at the step 16 takes place from the values of the channel and of the noise on each of the carriers. This computation takes place according to the relationship:

$$\text{Prod } (2m+1, j) = \frac{Sut._{2m+1,j} \cdot \text{Channel}_{2m+1}}{\text{Noise}_{2m+1,j}}$$

for j ranging from 1 to 41.
Sut.(2m+1), j is the useful signal on the frame 2m+1 and the carrier j,
Channel* 2m+1, j is the conjugate value of the channel under the same conditions, and Noise 2m+1. j is the noise under the same conditions.

What is claimed is:

1. A method of coherent modulation and demodulation for high frequency (HF) data transmission of information symbols at a high bit rate, comprising the steps of:

generating symbols including useful information symbols and reference information symbols;

coding the symbols according to a phase shift keying process, each symbol being represented by a signal having a predeterminated phase angle and amplitude;

modulating each coding symbol on a set of predetermined frequency channels having adjacent frequencies for obtaining a frequency frame for each symbol;

multiplexing in parallel frames of the reference symbols and frames of the useful information symbols, one frame of the reference symbol being inserted between two neighboring frames of the useful information symbols and each reference symbol being alternated with a useful information symbol in each frame of reference symbol;

transforming by a reverse Fourier transform resulting signals applied simultaneously on the channels during each frame;

transmitting on a HF channel a temporal signal obtained from the reverse Fourier transform;

and for demodulation:

recovering by a Fourier transform each frequency channel from the transmitted temporal signal;

evaluating the HF channel on each frame of reference symbol by calculating a ratio between a corresponding received signal in each channel and a determined reference signal temporal filtering of the ratio by calculating filter coefficients that reduce a mean error of estimation for obtaining a mean value of the ratio, determinating instantaneous noise values by calculating for each channel a square of a difference between its noise affected value and its estimated filtered value; and decoding each received symbol on each useful frame.

2. The method according to claim 1, further comprising the step of determining a Doppler shift of the signals received at each of the transmission frequencies by a mean, at all of the transmission frequencies, of phase differences found between two successive frames relatively to an estimated noise value of the transmission frequencies.

* * * * *